INVENTOR.
CURTIS WALKER

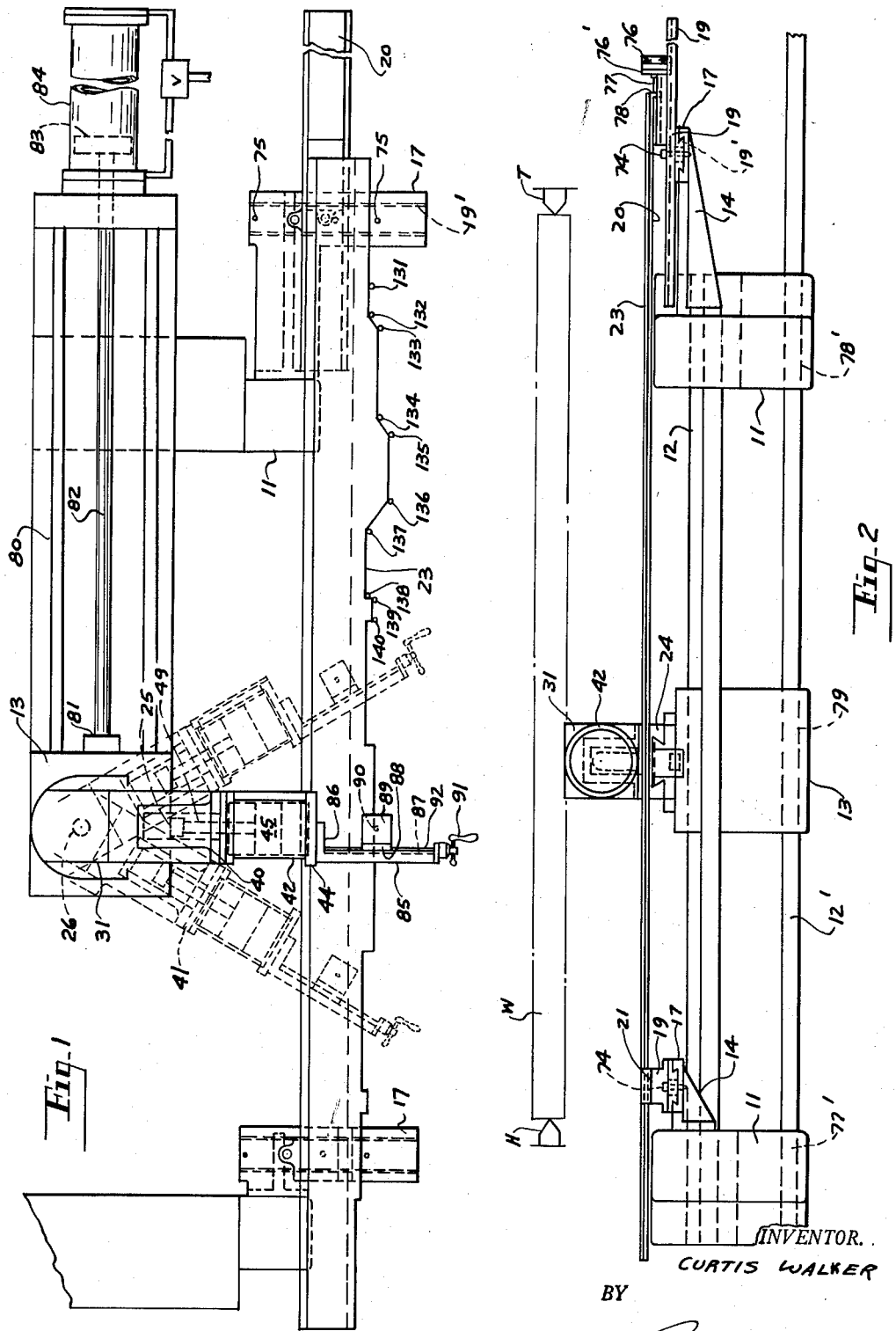

BY. Robert A. Sloman
ATTORNEY.

Jan. 3, 1956 C. WALKER 2,729,130
UNIVERSAL STEP TURNING DUPLICATOR FOR LATHES
Filed Aug. 9, 1952 4 Sheets-Sheet 3

INVENTOR.
CURTIS WALKER
BY
Robert A. Sloman
ATTORNEY.

United States Patent Office 2,729,130
Patented Jan. 3, 1956

2,729,130

UNIVERSAL STEP TURNING DUPLICATOR FOR LATHES

Curtis Walker, Standish, Mich.

Application August 9, 1952, Serial No. 303,586

2 Claims. (Cl. 82—14)

This invention relates to a duplicating attachment for a lathe, and more particularly to a swivelly adjustable compound for a lathe associated with duplicating mechanism for reproducing the shape of a template in a workpiece.

It is the object of the present invention to provide a novel and improved template mounting device whereby the template may be arranged in parallel relation to the longitudinal axis of the workpiece supported upon a lathe.

It is the further object of this invention to provide a novel template support secured to the lathe bed and adapted for positioning upon one side thereof and so constructed as to permit in and out adjustments of the template holder parallel to the axis of the workpiece.

It is the further object of this invention to provide a template holder upon the template support which is adapted for accurate longitudinal adjustments.

It is the further object of this present invention to provide a novel tracer mounting upon the swivelly adjustable compound whereby the tracer may be supported in an upright position and whereby said tracer may be accurately adjusted longitudinally of the hydraulic cylinder secured to the compound.

It is the further object of this invention to provide a novel mounting for the tracer mechanism whereby the longitudinal axis of the tracer is in a plane passing through the central axis of the cylinder.

These and other objects will be seen from the following specification and claims in conjunction with the appended drawings in which:

Fig. 1 is a plan view of a portion of a lathe illustrating the mounting thereon of the swivelly adjustable compound.

Fig. 2 is a side elevational view thereof.

It will be understood that the above drawings illustrate merely a preferred embodiment of the invention and that other embodiments are contemplated within the scope of the claims hereafter set forth.

Figure 3:
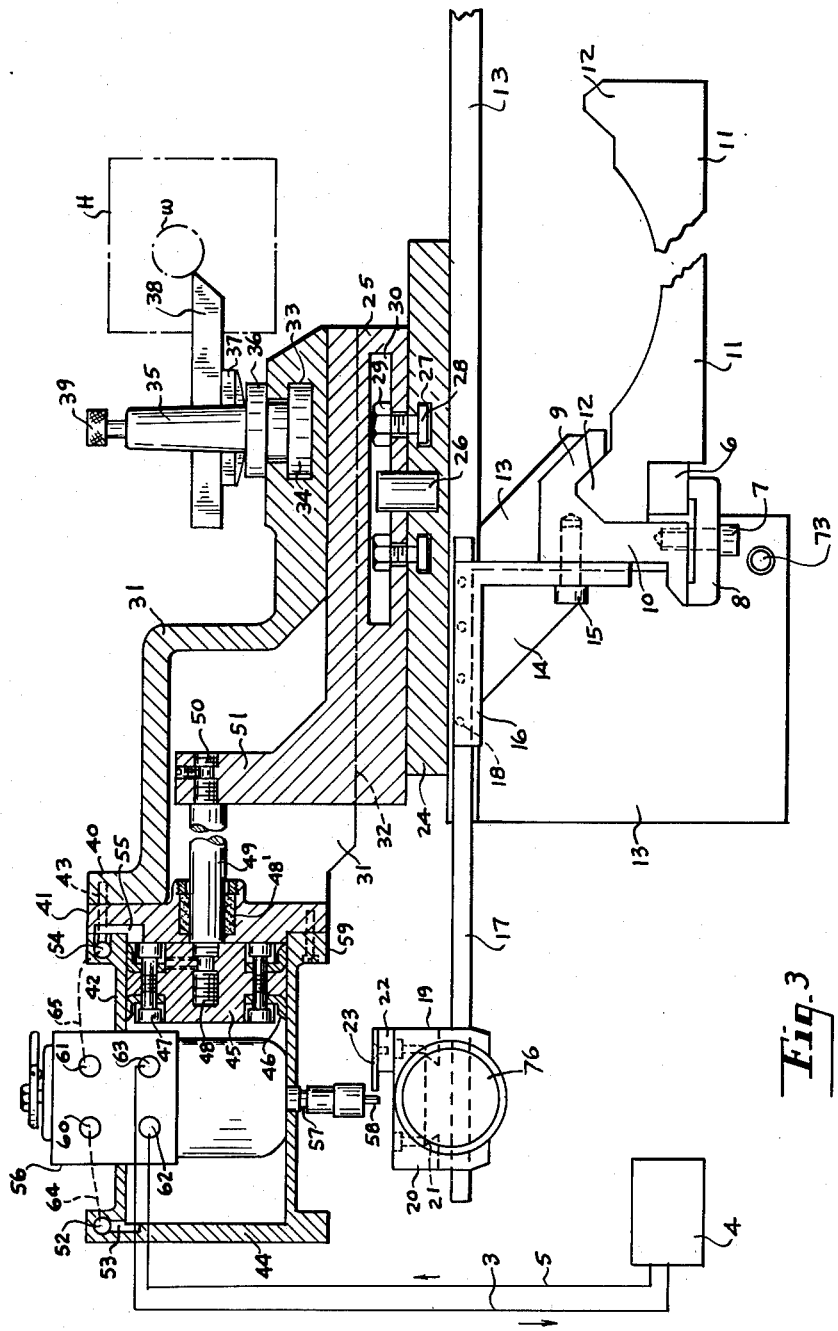
Fig. 3 is an enlarged end elevational section of the swivelly adjustable compound as in Fig. 1, but with the tracer housing mounted upon the side of the cylinder.

Referring to the drawings, Fig. 3 fragmentarily illustrates the lathe bed 11 with the longitudinally extending ways 12 upon which the lathe carriage 13 is supported and horizontally movable in a conventional manner. Mounted upon one side of the ways 12 adjacent opposite ends of said ways are a pair of clamps 10 which are secured to said ways by the overlying and angularly depending element 9 which bears against the inclined surface of the ways 12. There is a secondary clamp 8 secured to clamp 10 as by the bolts 7 for gripping the undersurface of the ways 12 as at 6.

By this construction, there are provided a pair of supports upon the ways 12 adjacent its opposite ends to which are secured the brackets 14 as by the bolts 15.

Though not shown in the drawings, the connection of the carriage 13 with the ways 12 is the same as the connection of the overhanging portion 9 of the clamp 10, except that the carriage 13 is slidably movable upon the ways 12 by any suitable mechanism such as the manually or power operated screw 73, for illustration.

As shown in Figs. 1, 2 and 3, the brackets 14 adjacent opposite ends of the lathe bed have horizontally extending transverse supports 16 within which are secured the inner ends of the outwardly extending template supports 17. Said template supports are immovably secured to said bracket elements by means of the screws or bolts 18.

As shown in Figs. 1 and 2, the supports 17 are parallel to each other and have slidably mounted thereon the adjustable template supports 19, which have a sliding dovetail connection 19' upon the supporting arms 17, as illustrated in Figs. 1 and 2.

There is also provided between the two in and out adjustable template supports 19 a longitudinally adjustable template holder 20 which has a dovetail mounting 21 with respect to the in and out template supports 19. Spacer strip 22 is suitably secured to the template holder 20 and upon its top surface is secured the horizontal template 23, whose irregularly shaped side edge is adapted for engagement with the side edge of the tracer tip 58, in the manner hereafter described.

Furthermore, as hereafter described the template holder 20 is adapted for accurate longitudinal adjustments with respect to the template supports 19 by means of a suitable screw 77 and a hand wheel 76, hereafter described in connection with Fig. 2.

Figure 5:
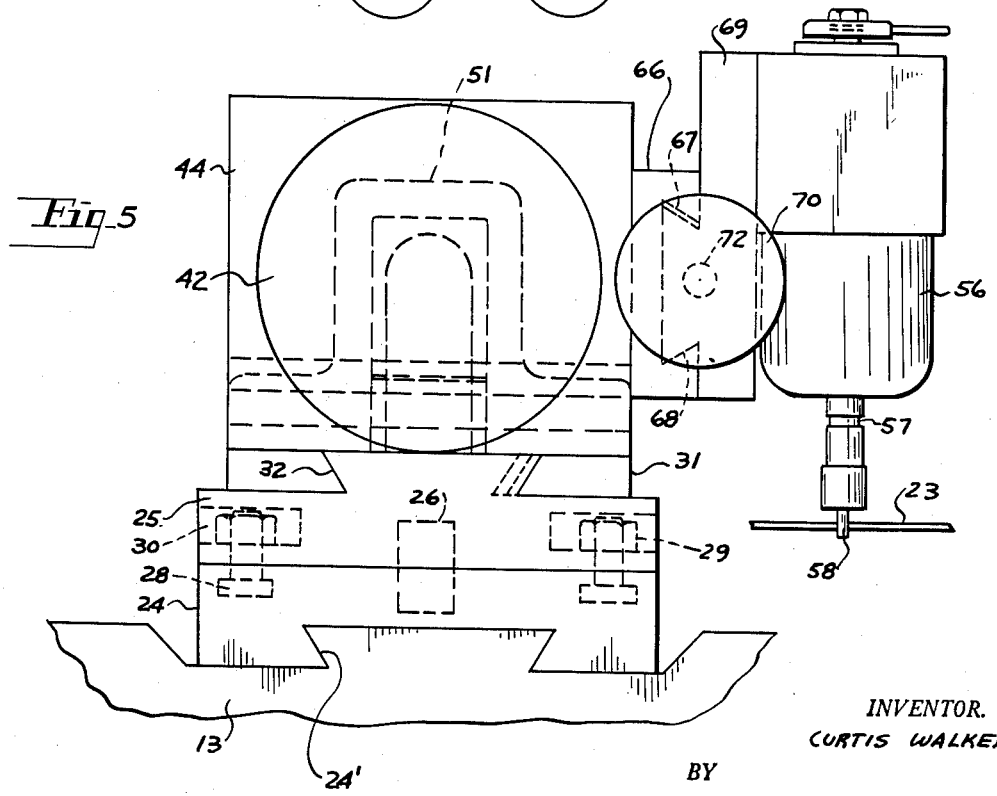
Fig. 5 is a left end view of Fig. 3 illustrating the mounting of the tracer upon the cylinder.

Referring to Fig. 3, slidably mounted upon the horizontally adjustable carriage 13 is a conventional transversely adjustable cross slide 24, which as shown in Fig. 5, has a dovetail connection 24' with respect to the carriage 13. Cross slide 24 is adapted for in and out adjustments at right angles with respect to the carriage 13 by means of a suitable conventional screw, not shown in the drawings. A cutting tool supporting compound is carried upon the cross slide 24 and includes the compound support 25 which is swivelly mounted upon cross slide 24 by the upright pin 26.

Cross slide 24 has a pair of arcuate slots 27 therein to receive the heads 28 of the upright locking bolts upon which are secured the adjustable nuts 29 positioned within the side recesses 30 in the compound support 25, as illustrated in Fig. 5.

By this construction, the compound support 25 may be pivoted to any desired selected position of adjustment, and may be secured in adjusted position by manually tightening the nuts 29.

A top slide 31 is slidably mounted upon the compound support 25, there being a suitable dovetail connection 32 provided between said top slide and support, as illustrated in Figs. 3 and 5.

Top slide 31 has a conventional inverted T slot 33 in its top surface at its forward end for adjustably receiving a similarly formed portion 34 of the vertically slotted tool holder 35. Disc 36 is mounted upon tool holder 35 and provides a support for the transverse plate 37 which extends through the upright slot in post 35, and which is adapted for supporting and mounting the cutting tool 38 within post 35 in any desired angular position. Set screw 39 is adapted for securing the cutting tool 38 within post 35.

Top slide 31 has an upright extension 40 at its rear end against which is mounted the cylinder head 41 and the circular flange 59 of the hydraulic cylinder 42. And these parts are secured together by a plurality of bolts, such as the bolt 43.

Cylinder 42 is closed at its outer end by the cylinder head 44, and it is apparent from Fig. 3 that the cylinder 42 is immovably secured to top slide 31 for reciprocal movements in unison.

The stationary piston 45 within said cylinder includes a pair of piston cups 46 cooperable with the interior cylindrical surface of said cylinder and secured to said piston as by the bolts 47.

Piston rod 49 is secured at one end at 48 to piston 45, extends through the packing 48' in cylinder head 41, and is secured at its outer end at 50 to the upright extension 51 upon the relatively stationary compound support 25.

Cylinder 42 has a pressure fluid inlet port 52 formed in the cylinder head 44 and joined to passageway 53 for supplying pressure fluid to the interior of said cylinder upon one side of the piston 45.

Said cylinder has a second pressure inlet port 54 formed within the cylinder head 59 at its opposite end and connected with passageway 55 for delivering pressure fluid to the interior of said cylinder upon the opposite side of piston 45. A tracer 56 is employed in the present construction which includes a valve hereafter described responsive to movements of a tracer spindle for controlling the flow of pressure fluid to either of the ports 52 or 54 for effecting movements in one direction or the other of the cylinder 42 and, of course, simultaneous movements of the cutter carrying top slide 31 to which it is secured.

The tracer 56 has a longitudinally extending spindle 57 therein which projects axially therefrom and terminates in the tracer tip 58, the latter being adapted for cooperable engagement with the longitudinal irregular edge of the template 23 and responsive to lateral thrusts of said template with respect to said tracer for controlling longitudinal movements of spindle 57 in the manner hereafter described.

The tracer body 56 has formed therein the two pressure fluid ports 60 and 61 which are respectively connected with the cylinder ports 52 and 54 by the flexible conduits 64 and 65. Depending upon the positioning of the valve within the tracer, if pressure fluid is directed outwardly through the port 60 and conduit 64 to the outer end of cylinder 42, it is apparent that said cylinder and the attached top slide 31 will move to the left with respect to the stationary piston 45. During this movement to the left the fluid within the cylinder upon the opposite side of piston 45 will be forced outwardly through port 54 and conduit 65 back to port 61 of the tracer body for subsequent exhausting in the manner hereafter described.

Conversely a different positioning of the tracer valve will cause pressure fluid to flow outwardly through port 61 and the conduit 65 for effecting movement to the right of cylinder 42. And exhaust fluid will return to the tracer body through port 52, conduit 64 and tracer port 60.

Tracer body 56 also has a pressure fluid supply port 62 adapted for receiving pressure fluid from the supply pipe 5 which is connected to a hydraulic unit 4 which includes a fluid storage sump and a suitable motor and pump for supplying pressure fluid to the delivery pipe 5. Tracer body 56 also has an exhaust port 63 whereby the exhaust fluid from the opposite end of the cylinder to which fluid is supplied at one end will be returned to the hydraulic unit 4 and storage sump by means of the conduit 3.

Figure 4:
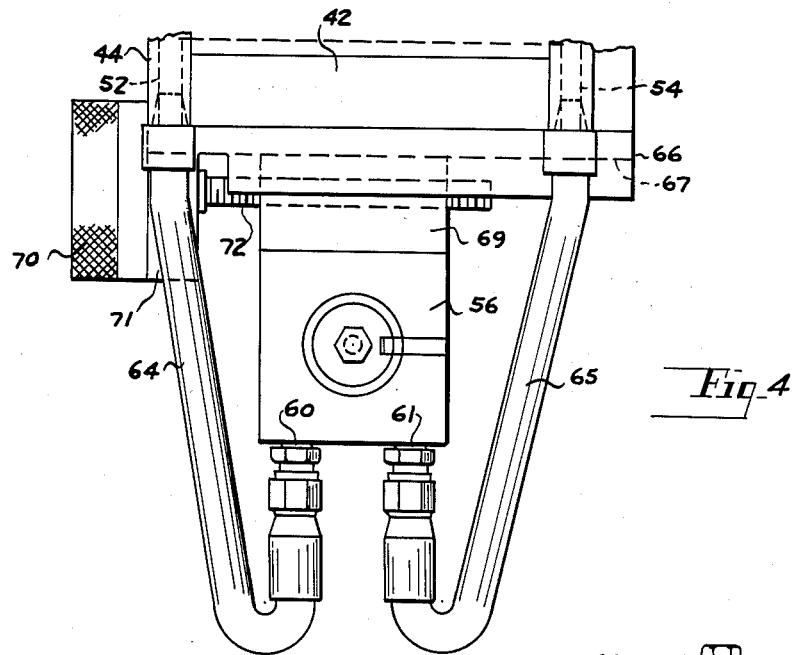
Fig. 4 is a fragmentary plan view illustrating the mounting of the tracer upon one side of the cylinder.

The tracer body 56 is preferably mounted in an upright position with its longitudinal axis at right angles to the longitudinal axis of cylinder 42, and in the preferred embodiment is mounted upon one side of said cylinder as shown in Figs. 3, 4 and 5.

Referring to Fig. 5, there is shown an elongated mounting block 66 which is secured to the cylinder 42 upon one side thereof and parallel to the longitudinal axis of said cylinder. Said block has an elongated dovetail slot 67 formed therein adapted to slidably receive the dovetail 68 which projects laterally from mounting plate 69 secured to the tracer body 56, all as shown in Fig. 5.

The hand wheel 70 has secured thereto a threaded screw 72 which projects through the stationary support 71 and threadedly engages the dovetail 68 whereby rotation of the hand wheel 70 can effect accurate longitudinal adjustments of the tracer body upon the side of the cylinder 42.

Referring to Fig. 3, 73 designates a lead screw which may be manually or power operated for effecting longitudinal reciprocal movements of the carriage 13 upon the guide ways 12 in a conventional manner.

Referring to Figs. 1 and 2, it appears that the two template supports 19 are adapted for in and out adjustments upon the members 17 towards and away from the axis of the workpiece which is designated by the letter W in Fig. 3, and which is rotatably journaled between a conventional head stock and tail stock of the lathe; the head stock being diagrammatically indicated in dotted lines and designated by the letter H in Fig. 3, and the tail stock is diagrammatically indicated by the letter T in Fig. 2.

The template support 19 may be secured in the desired in and out position of adjustment by the upright headed pins 74 which loosely extend down through transverse openings in the template support 19 and into the corresponding opening 75 of a plurality of transversely spaced openings formed in the two supporting plates 17, as illustrated in Fig. 1.

As above described the template holder 20, as shown in Figs. 1, 2 and 3, is also adapted for longitudinal adjustments for regulating the longitudinal positioning of the template 23, as desired. For this purpose there is provided a hand wheel 76 which has secured thereto a horizontally extending screw 77, which projects through the stationary support 76' on the template support 19 and threadedly engages the depending dovetail block 78 of the template holder 20. The hand wheel 76 is retained against longitudinal movement, and consequently rotary movement of said hand wheel will effect longitudinal adjustments of the template holder 20 with respect to its support 19.

There is shown in Fig. 2 a second longitudinally extending guide or way 12' parallel to way 12 which is secured at its opposite ends as at 77' and 78' to portions of the lathe bed 11 and is adapted to slidably receive and support a portion of the carriage 13 as at 79.

Referring to Fig. 1, there is shown a different method of feeding the carriage 13 other than by the lead screw 73 shown in Fig. 3. In this case, the carriage 13 is slidably supported upon the plate 80 to which is secured the cylinder 84. Piston 83 within said cylinder is joined to the piston rod 82 which is secured at its opposite end at 81 to the carriage 13 whereby pressure fluid delivered to one end or the other of cylinder 84 will effect longitudinal feed movements of carriage 13.

In Fig. 1, there is also shown a slightly different support for the tracer body 89 which instead of being positioned upon the side of cylinder 42 as in Figs. 3 and 5, is arranged directly behind said cylinder, but is also adapted for longitudinal in and out adjustment. Transversely arranged horizontal plate 85 has a right angular end plate 86 which is suitably bolted and secured to the cylinder head 44 of cylinder 42, Fig. 1, and the plate 85 has formed therein a longitudinally extending dovetail slot 87 adapted to cooperatively receive a corresponding dovetail projecting from the tracer supporting plate 88. The tracer 89, whose tracer tip is designated at 90 in dotted lines, is adjustable inwardly and outwardly of the cylinder 42 by means of the hand lever 91 upon the outer end of the lead screw 92. Said lead screw is retained against longitudinal movement upon the plate 85 and threadedly engages the dovetail of the tracer supporting plate 88 whereby rotation of the hand lever 91 will effect accurate in and out adjustments of the tracer body with respect to the cylinder 42 at the same time effecting a corresponding adjustment manually of the tracer tip 90 with respect to the edge of the template 23.

It will be noted that the tracer tip 90, and for that matter the longitudinal axis of the tracer body 89 lies in a plane passing through the longitudinal axis of the cylinder 42 and the swivel or pivot 26 about which the compound 31 rotates with its supporting plate 25.

Consequently, regardless of the angular position of said compound, as shown in the dotted lines in Fig. 1, the tracer spindle and the tracer tip will always be in longitudinal alignment with the longitudinal axis of the cylinder 42 as well as the pivot 26.

Figure 6:
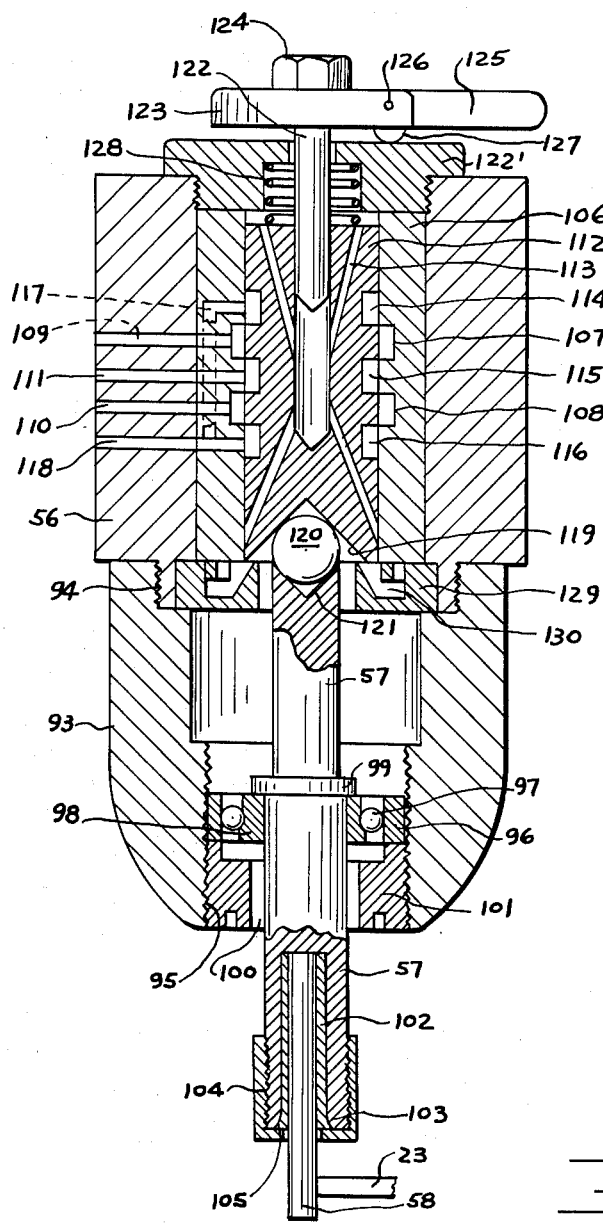
Fig. 6 is an elevational section of the tracer mechanism illustrating its construction.

Referring to Fig. 6, there is shown an enlarged elevational section of the universal type tracer employed in the present invention. Said tracer includes the body 56 with the depending formed body element 93 which threadedly engages the body 56 at 94 and which has an axial threaded opening 95 within which is positioned the horizontally arranged ball bearing race 96 with a plurality of circularly arranged balls 97 cooperable with the circular sleeve 98 secured adjacent the shoulder 99 to the tracer spindle 57. There is also provided an adjusting screw 101 which is threaded up into the opening 95 in the tracer body element 93 for adjustably supporting the ball bearings 96—97, and said adjusting screw has a central opening 100 adapted to loosely receive spindle 57.

The lower end of said spindle has a longitudinal recess formed therein terminating in the outwardly tapered portion 105, Fig. 6. The tracer tip 58 is positioned within an expansion collet 102 of cylindrical shape which has an outwardly tapered outer surface 103 cooperable with the tapered opening 105 at the lower end of the spindle 57, so that when said collet is projected within the spindle as shown in Fig. 6 it exerts a slight outward pressure upon the lower end of the spindle. Furthermore, the hollow nut 104 when threaded over the lower end of said spindle cooperates with said lower end to thereby firmly secure the tracer tip 58 within the lower end of said spindle.

The present tracer mechanism is a universal type tracer inasmuch as the control of the template with respect to the tracer tip 58 is by virtue of lateral thrust upon the side of the tracer tip 58 in accordance with the relationship shown in Fig. 3. Thus, the spindle 58 is adjustably supported through and by the ball bearing assembly 96—97, and the control valve 112 is adapted to rest upon the upper end of said spindle for upward and downward movements corresponding to upward and downward movements of said spindle.

Cylindrical sleeve 106 is secured within the tracer body 56 and has formed therein upon its interior surface a pair of longitudinally spaced annular recesses 107 and 108. Passage 109 is formed through the tracer body and through said sleeve and is joined to annular recess 107. Passage 110 is also formed through said tracer body and sleeve and is joined at its inner end to recess 108. These passages are respectively joined to the ports 60 and 61; and it will be apparent that upward movement of the valve 112 above the neutral position shown in Fig. 6, caused by a positive deflection of the tracer tip 58 responding to a rise or obstruction in the template 23, will cause a flow of pressure fluid through passage 109, port 60, conduit 64 and cylinder port 52 to the outer end of cylinder 42. This will effect such withdrawing movement of the cylinder, the cutter connected thereto as well as the tracer and its tracer tip 58 as will relieve such increased lateral pressure from the tracer tip 58 permitting the same to return to its neutral position shown in Fig. 6 under the action of the coiled spring 128.

Should the tracer tip 58 engage a portion of the template such as a depression or inclination closer to the axis of the workpiece, there will be a reduction in the initial lateral pressure of the template 23 on the tracer tip when it is in its neutral position. This reduction in pressure will permit the spring 128 to move the valve 112 downwardly slightly, a matter of a few thousandths of an inch, and pressure fluid will then be delivered from recess 108 into passage 110, port 61, conduit 65, port 54 and into the right end of cylinder 42 to effect such inward movement of said cylinder, cutter and tracer tip 58 as will bring about an increase of lateral thrust or pressure upon the tracer tip 58 as will return the valve 112 against the action of the spring 128 to the central neutral position of Fig. 106.

There is a third passage 111 formed within tracer body 56 and sleeve 106 which communicates at its inner end with the annular recess 115 formed in the exterior surface of valve 112. The outer end of passage 111 is connected to the fluid delivery pipe 5, diagrammatically shown in Fig. 3, which is joined to the hydraulic unit 4.

In normal operation and without a feed movement of the carriage 13, or for that matter during any traversing of the tracer tip 58 along a portion of the template 23 which is parallel to the longitudinal axis of the workpiece W, there will be such a lateral thrust or pressure relationship between the longitudinal edge of template 23 and the side of the tracer tip 58 as will position the valve 112 in the neutral position shown in Fig. 6.

Consequently, though fluid under pressure is supplied from passage 111 to the valve recess 115, this fluid will neither be in communication with sleeve recess 107 nor sleeve recess 108, so that there will be no flow of pressure fluid to either end of cylinder 42.

This means that the neutral position accomplished prevents either inward or outward movement of the cutter 38 with respect to the workpiece W, Fig. 3, which is just what is desired at all times when there is no feed movement of the carriage or when the tracer tip is moved along a straight portion of the template 23 which is exactly parallel to the longitudinal axis of workpiece W.

Referring to Fig. 6, there are formed a plurality of angular passages 113 within valve 112 for conducting any seepage of oil to the lower end of sleeve 106, which can be received within the annular recess 130 formed within the collector 129.

By a structure which forms no part of the present invention, a vacuum line from the hydraulic unit is connected to the recess 130 in said collector for withdrawing collected fluid as it accumulates, and this prevents the seepage of such excess fluid down the spindle 57.

Valve 112 has an additional pair of annular recesses 114 and 116 arranged upon opposite sides of annular recess 115. These recesses are provided for conducting exhaust fluid from one end of the cylinder 42 back to the sump through the exhaust port 63 which is connected by the pipe 3 with the storage sump within the hydraulic unit 4 shown in Fig. 3.

Exhaust passage 118 is formed through the tracer body and sleeve and at its inner end is joined to annular recess 116. The other annular recess 114 is also connected to the exhaust passage 118 by the auxiliary passage 117 formed within the sleeve 106.

For illustration, it is apparent that in any position of the valve 112 above or below the central neutral position shown in Fig. 6, that pressure fluid from passage 111 and in valve recess 115 will be in communication with either of the sleeve recesses 107 or 108 for conducting pressure fluid to one end or the other of cylinder 42.

For example, if the valve 112 is above the neutral position responsive to a positive lateral thrust of the template upon the side of the tracer tip 58, pressure fluid will be delivered to one end of said cylinder through the passage 109. Exhaust fluid from the opposite end of said cylinder upon the other side of the piston 45 will be returned to the tracer body and into passage 110 which communicates with sleeve recess 108. In the elevated position of valve 112 recess 108 is in communication with valve exhaust recess 116 which will permit the exhaust flow outwardly through passage 118, port 63, and pipe 3 back to the storage sump in the hydraulic unit 4.

Conversely, with the valve below the neutral position pressure fluid is delivered outwardly through passage 110 to the opposite end of said cylinder, and exhaust fluid is delivered into passage 109 and sleeve recess 107. With the valve 112 below the neutral position of Fig. 6, this latter recess 107 communicates with valve exhaust recess 114 so that exhaust fluid passes through passage 117, passage 118 and back to the sump.

Referring to Fig. 6, a conical central recess 119 is formed in the lower end of valve 112 and is adapted to receive the ball 120 which rests within a similar conical recess 121 in the upper end of spindle 57. This is the connection of the spindle with the valve.

Pin 122 is secured to the upper end of valve 112 and extends through a central opening in the valve body cover 122' and upon the exterior thereof carries a disc 123 secured by the nut 124. Hand control lever 125 is pivoted to disc 123 at 126 and has a depending cam 127 which cooperates with the cap or cover 122' whereby upon manipulation of lever 125 the valve 112 may be raised or lowered as desired to provide a manual control for the tracer mechanism.

This is particularly useful in setting up the machine as it has the same effect upon the valve as if the valve were controlled by the spindle.

The cap 122' has an interior recess which receives the coiled spring 128, the lower end of which bears down upon valve 112, normally urging said valve to a negative position below the central position shown in Fig. 6.

In operation whenever the tracer is out of contact with the template 23, the spring will move the valve into a negative position below that shown in Fig. 6, and this will always have the effect when the hydraulic unit is operative of causing such inward feed movement of cylinder 42 and the tracer carried thereby until the tracer tip 58 engages the edge of the template 23 with such pressure as will return the valve to a neutral position. At such time, of course, there is no flow of fluid to either end of cylinder 42 so that the same, as well as the compound top slide 31 and the cutter 38 will be stationary with respect to the workpiece W.

In setting up the machine at this time, it is essential that cutting edge of the cutter 38 be in engagement with the workpiece W. The reproducing operation will take place just as soon as there is a longitudinal feed movement of the carriage 13 either under the control of the feed screw 73 shown in Fig. 3, or under the hydraulic control of the cylinder 84 in Fig. 1. It is apparent from Fig. 1 that by supplying pressure fluid through a suitable valve to one end or the other of cylinder 84, that said feed movements of the piston within said cylinder may be controlled.

In operation referring to Fig. 1, the compound top slide 31 and its support 25 may be in the solid line right angular position shown or may be swivelled about pivot 26 to any intermediate desired dotted line position, such as shown, and secured in said position for the traverse of the tracer tip 58 or 90 with respect to the template 23.

It is contemplated that there will be times when it will be desired to shift the compound from one position to another, and this may be done at will without effecting the operation of the reproducing mechanism. There may be many situations where the compound will be arranged at right angles to the direction of feed of the carriage as shown in Fig. 1, and other situations where the compound will be arranged at an inclination to the axis of the workpiece, or direction of movement of the carriage.

For illustration, with the tracer tip 58 in the position 131 of Fig. 1, and assuming a longitudinal feed of the carriage to the left, the tracer tip 58 will be in a neutral position and there will be no in or out feeding of the top slide of the compound and the cutter 38 connected thereto, so that said cutter will reproduce in the work piece a straight line portion parallel to the corresponding straight line portion of template 23.

At point 132, Fig. 1, there will be a positive deflection of the tracer tip 58 and the cylinder will withdraw the cutter to form in the workpiece an inclined surface corresponding to the inclination of the incline on the template over which the tracer is passing.

At point 133 the tracer returns to a neutral position and the traverse thereafter will continue in a straight line without in or out movement.

At point 134 there will be a positive deflection and again the cylinder and cutter will move outwardly as the tracer moves along the inclined surface of the template to form a corresponding inclined surface in the workpiece until point 135 is reached.

At point 136 there is the beginning of a negative deflection as the template is falling away from the tracer tip. This reduces the original pressure of the tracer tip on the template and the valve 112 is moved by the spring 128 to such position within sleeve 106 that the cylinder 42 and the cutter will feed inwardly, and due to the continuous feeding of the carriage the cutter will cut a path in the workpiece on a taper corresponding to the tapered surface on the template until point 137 is reached at which point the pressure on the tracer tip will be increased repositioning the tracer tip and its valve in a neutral position. When the tracer reaches the point 138 there will be an extreme positive deflection of the tracer tip causing the cylinder 42 to back away from the axis of the workpiece to thereby reproduce the shoulder on the template. Under some conditions it will be desirable to have the compound including the top slide 31 at an inclined position, such as one of the dotted line inclined positions shown in Fig. 1. For instance, assuming that the carriage has continued in its feeding, while the tracer is negotiating the right annular shoulder on the template it is necessary that the total longitudinal feed component be zero, otherwise the tracer will be broken or bent. Under this condition, if the compound is in the selected position shown in the right hand dotted line indication shown in Fig. 1, then in response to this positive deflection at the corner of the shoulder, the cylinder 42 will withdraw at an angle. Consequently, even though the carriage feed is continuous, the longitudinal component of feed of the tracer and cutter will be zero until the tracer has negotiated the shoulder and reaches the point 139.

In continuing the feed movement to the left of the tracer with respect to the template, when the tracer reaches the point 140, the tracer tip would go into an extreme negative position to cause an inward feeding of cylinder 42. As the carriage is moved continuously, it would be impossible to cut sharp corners corresponding to said shoulder, unless the compound was swivelled to the left hand inclined dotted line position shown in Fig. 1. Here again the total longitudinal component of feed of the cutter must be zero to negotiate the far side of this shoulder commencing at the position 140, and this is possible due to the inclined inward movement of the top slide 31 when it is swivelled to the left hand dotted line position.

By the above construction it is apparent that the present compound may be easily swivelled as desired to the position which is most effective for the reproducing operation.

Having described my invention, reference should now be had to the claims which follow for determining the scope thereof.

I claim:

1. In a universal step turning duplicator having a bed, a head stock and tail stock for supporting a workpiece, and ways parallel to the workpiece axis; a carriage mounted on said ways movable longitudinally thereof, power means joined to said carriage for effecting continuous feed movements thereof, a cross slide on said carriage and adjustable transversely of the direction of said carriage movements, a compound support swivelly mounted on said cross slide and selectively positionable relative to the direction of movement of said carriage, means for securing said support to said cross slide in selected adjusted position, a cutter carrying top slide slidably mounted upon said support, a hydraulic motor joined to said top slide, a template support upon said bed and mounting a template with the plane of its profile parallel to the workpiece axis, a tracer housing adjustably secured to said motor with its axis at right angles to the workpiece axis, a valve in said housing for controlling the flow of pressure fluid from a pressure source to said motor, a spindle engaging said valve, universally mounted within said housing and depending axially therefrom with its depending end engageable with the template profile at a predetermined lateral pressure and responsive to lateral thrust and relief therefrom during feed movements of said carriage, whereby deflections of said spindle operate said valve to control said motor tending to maintain said predetermined pressure whereby said cutter reproduces in said workpiece the profile of said template, a horizontal support plate mounted upon the outer end of said motor and extending rearwardly thereof and having a horizontally extending dovetail recess therein, a mounting block on said tracer having a dovetail longitudinally slidable within said recess, and a hand screw mounted and journalled on said support plate and threadedly engaging said dovetail for effecting in and out adjustments of said spindle relative to said workpiece axis, the longitudinal axis of said spindle being in a vertical plane passing through the longitudinal axis of said motor.

2. The duplicator of claim 1, said template support including a pair of parallel longitudinally spaced arms mounted on said bed and projecting laterally therefrom at right angles to the workpiece, a template holder bridging said arms, arranged parallel to the workpiece axis, and laterally slidable upon said arms, locking pins projecting through apertures in said template holder and selectively through one of a plurality of longitudinally spaced apertures in said arms for securing said holder in laterally adjusted position, said template holder including a longitudinally adjustable slide, and a lead screw engageable with said slide for effecting such longitudinal adjustments for accurately positioning the profile of said template with respect to said spindle.

References Cited in the file of this patent

UNITED STATES PATENTS

| 2,326,240 | Malzahn | Aug. 10, 1943 |
| 2,475,326 | Johnson | July 5, 1949 |
| 2,559,138 | Waterson | July 3, 1951 |
| 2,587,542 | Siekmann | Feb. 26, 1952 |
| 2,603,117 | Turchann et al. | July 15, 1952 |
| 2,645,148 | Von Zelewsky | July 14, 1953 |
| 2,652,731 | Turchan | Sept. 22, 1953 |
| 2,691,913 | Waterson | Oct. 19, 1954 |

FOREIGN PATENTS

| 658,590 | Great Britain | Oct. 10, 1951 |
| 660,112 | Great Britain | Oct. 31, 1951 |